UNITED STATES PATENT OFFICE.

EPHRAIM WILSON, OF BUCHANAN, MICHIGAN.

IMPROVEMENT IN MEDICAL COMPOUNDS OR SALVES.

Specification forming part of Letters Patent No. 130,263, dated August 6, 1872.

*To all whom it may concern:*

Be it known that I, EPHRAIM WILSON, of Buchanan, in the county of Berrien and State of Michigan, have invented a new Medical Compound; and I do hereby declare that the following is a full, clear, and exact description thereof.

My invention consists in an ointment which I denominate Golden Ointment, which is composed of lard, elder bark, rosin, and, in certain cases, oil of origanum and oil of rosemary, mixed together in about the proportions hereinafter explained, and intended as a remedial agent for the cure of rheumatism, fistula, cholera morbus, diarrhea, dysentery, piles, and many other diseases.

Formula.

Lard, one pound; elder bark, twelve ounces; rosin, ten ounces; oil origanum, one sixth of an ounce; oil rosemary, one-sixth of an ounce.

These ingredients, when mixed together, form a very smooth ointment.

For piles the origanum and rosemary are omitted, owing to their irritating properties.

The lard is used as the base of the ointment, owing to its emollient, penetrating, and healing qualities. The elder bark for its alleviating and exterminating effects; at the same time it contributes a degree of warmth to the affected parts. Rosin for its purifying and healing effects. Oils of origanum and rosemary for their stimulating or tonic effects.

While I have described the most preferable proportions of the several ingredients I do not confine myself to these exact proportions, as they may be varied to suit the nature of the case.

What I claim as new, and desire to secure by Letters Patent, is—

The medical compound herein described.

EPHRAIM WILSON.

Witnesses:
JOHN DE ARMOND, Jr.,
A. W. LUTHER.